March 20, 1934. C. G. STRANDLUND 1,951,376
CULTIVATOR
Original Filed Feb. 6, 1926 6 Sheets-Sheet 4
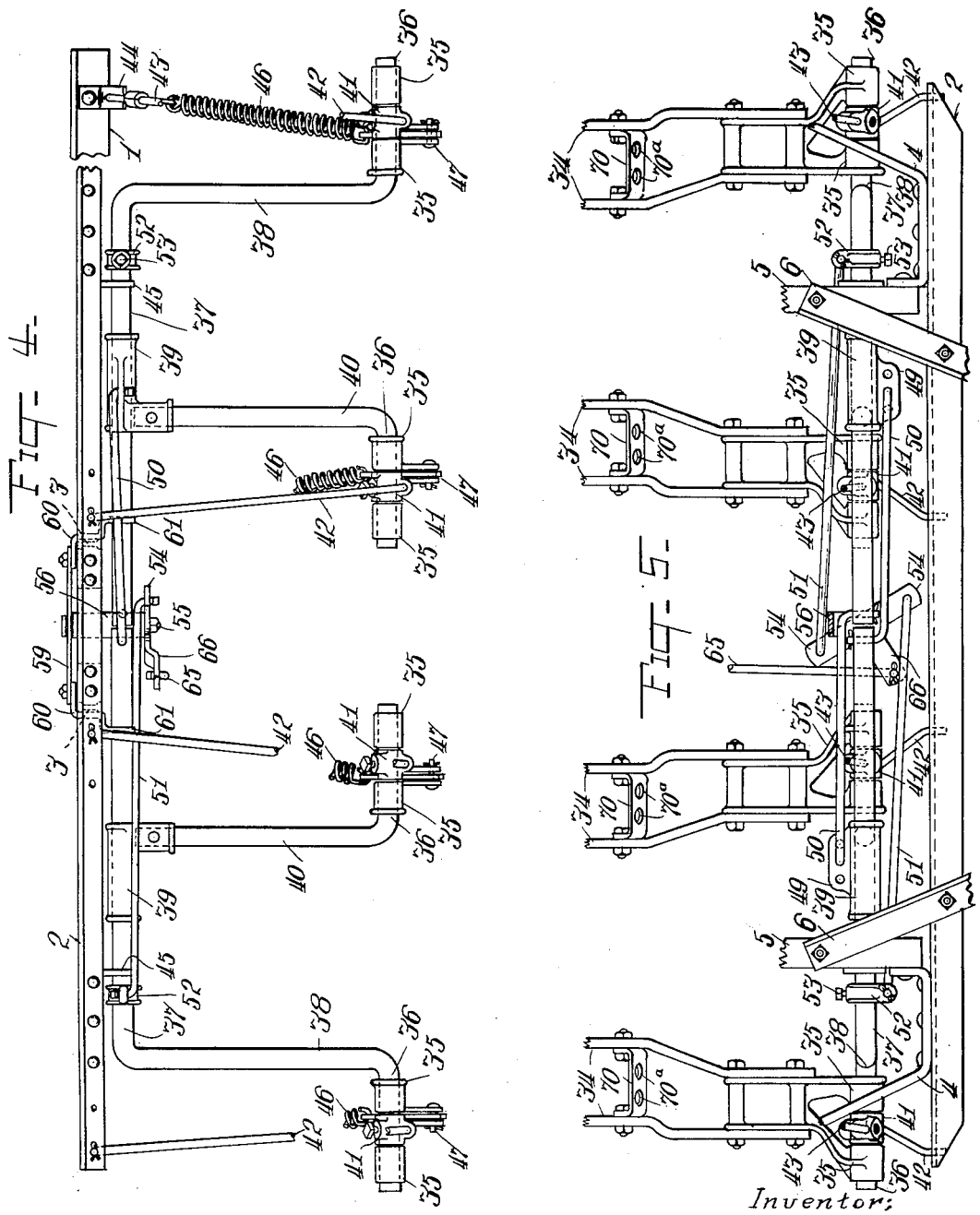
Inventor:
Carl G. Strandlund,
by John L. Jackson,
Attorney March 20, 1934.   C. G. STRANDLUND   1,951,376
CULTIVATOR
Original Filed Feb. 6, 1926   6 Sheets-Sheet 5
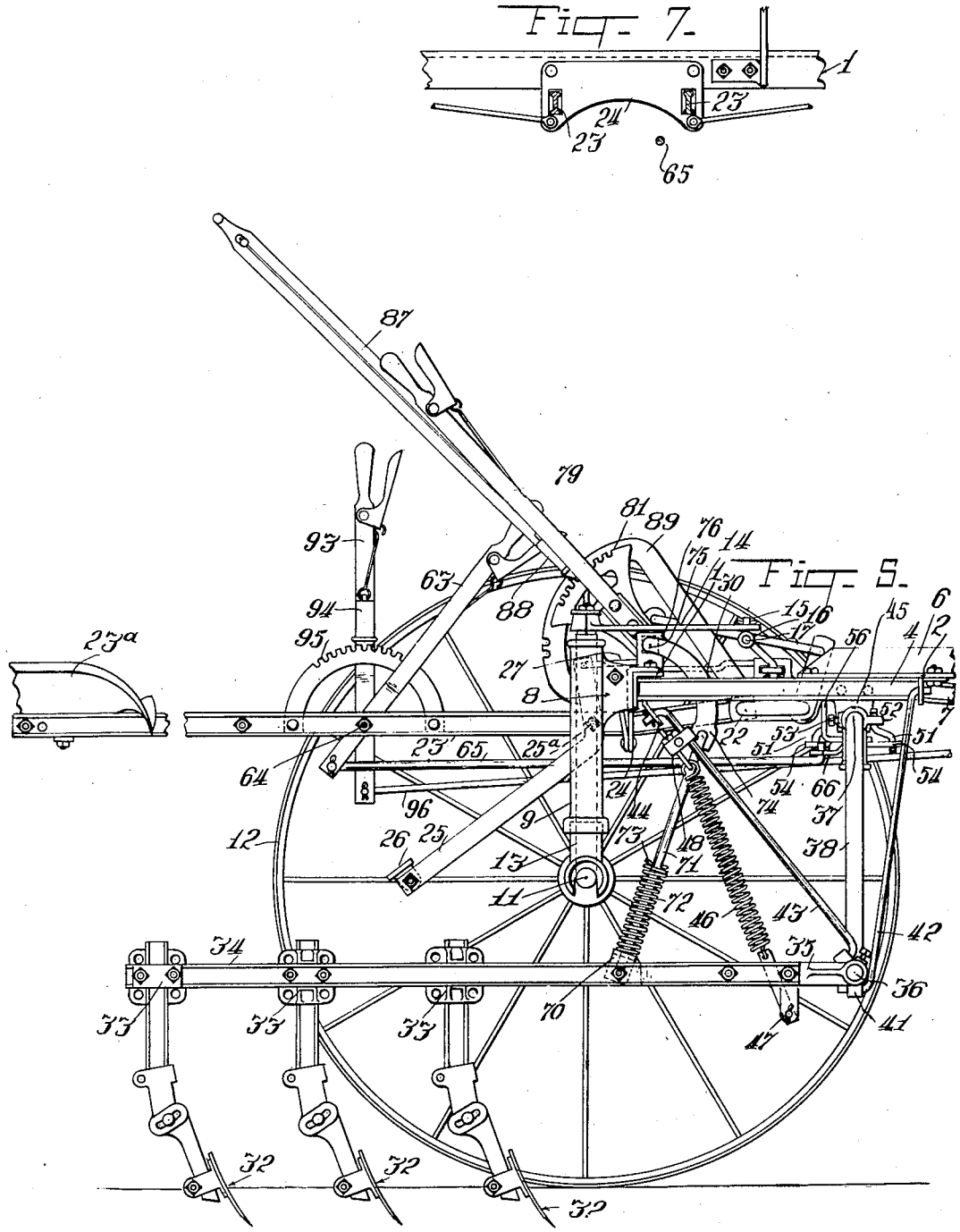
Witness:
W. A. Furner.
Inventor:
Carl G. Strandlund,
by John L. Jackson,
Attorney March 20, 1934.  C. G. STRANDLUND  1,951,376
CULTIVATOR
Original Filed Feb. 6, 1926   6 Sheets-Sheet 6
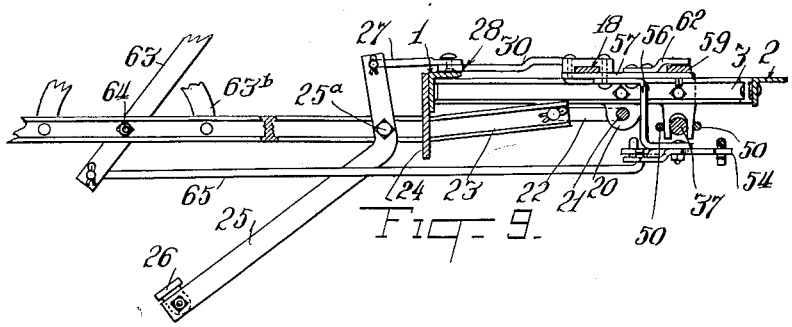
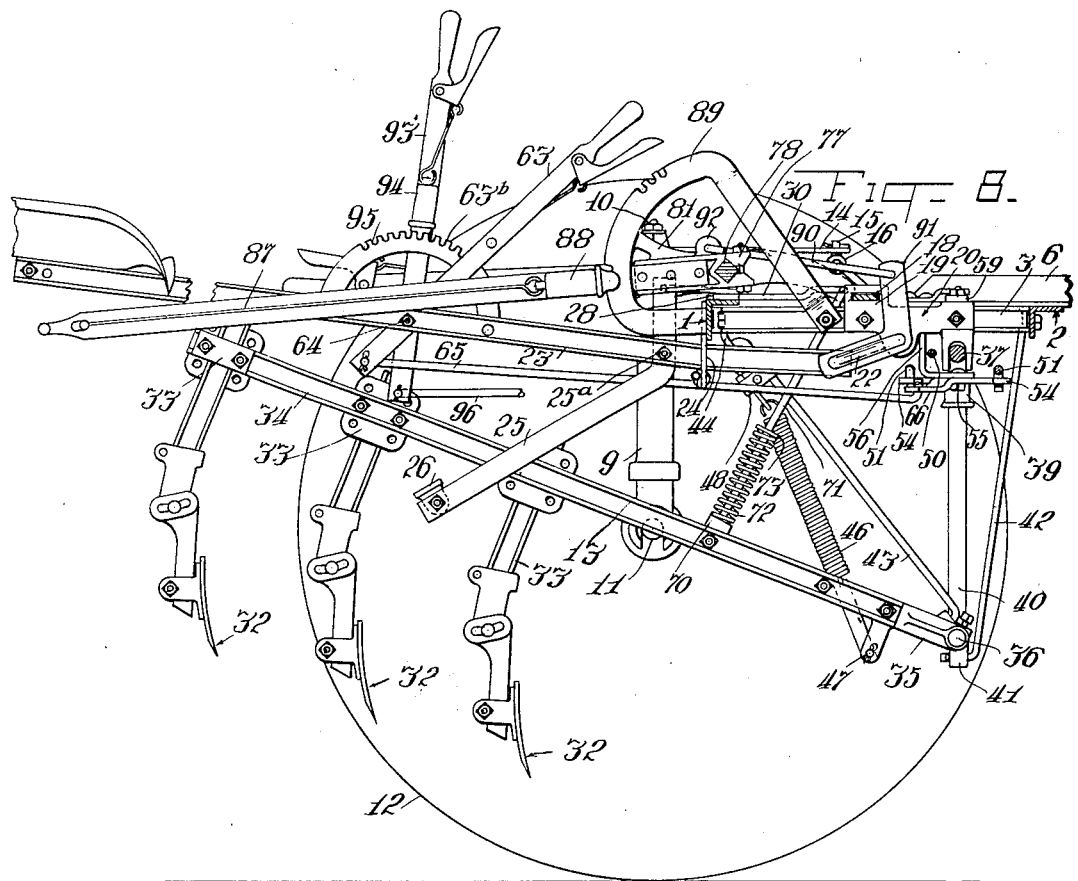
Witness;
W. A. Furrrer.
Inventor;
Carl G. Strandlund,
by John L. Jackson.
Attorney.

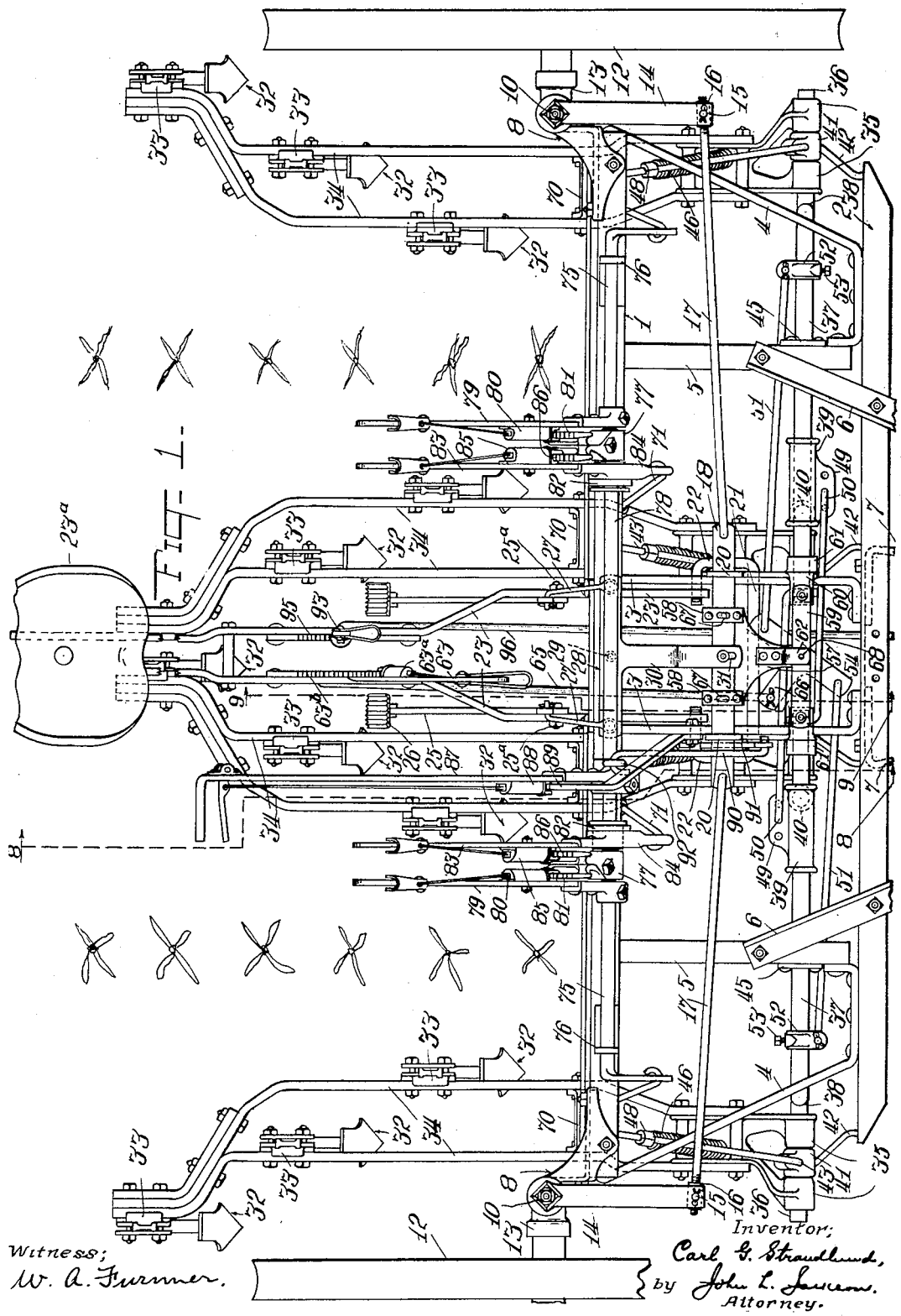

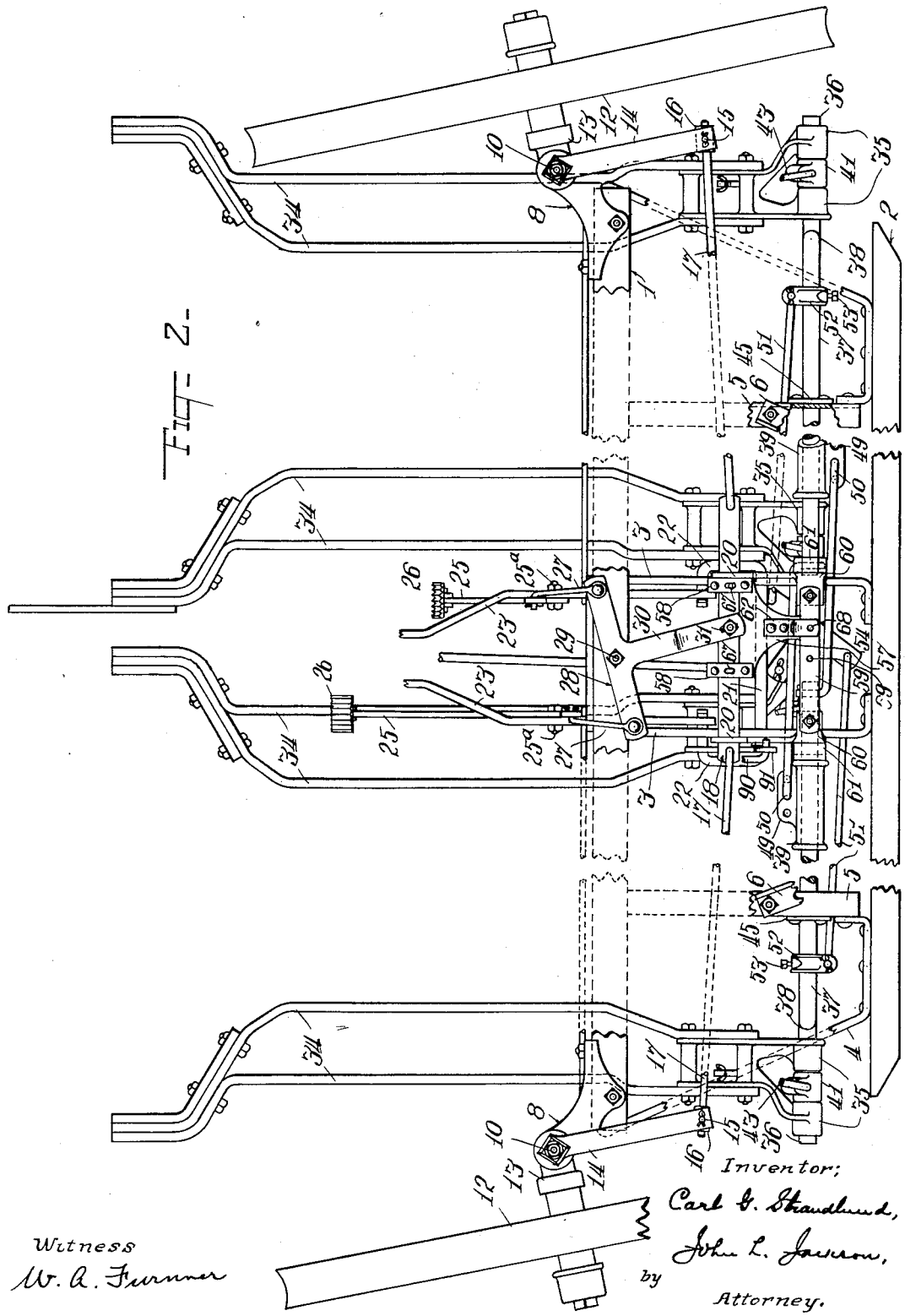

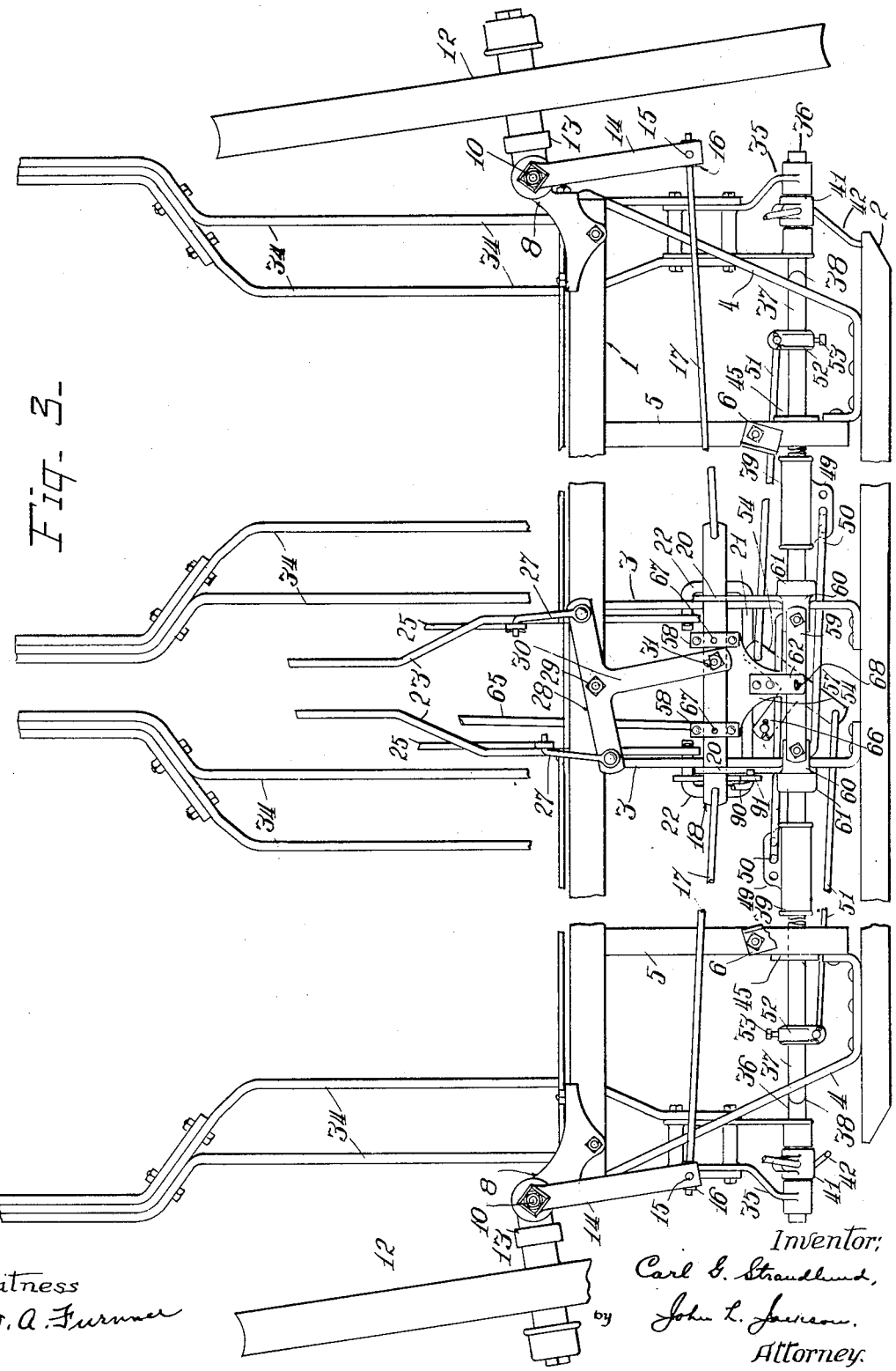

Patented Mar. 20, 1934

1,951,376

UNITED STATES PATENT OFFICE 1,951,376

CULTIVATOR

Carl G. Strandlund, Moline, Ill., assignor to Deere & Company, Moline, Ill., a corporation of Illinois Application February 6, 1926, Serial No. 86,407
Renewed December 17, 1930

50 Claims. (Cl. 97—155)

My invention relates to cultivators of the two-row type and has for its object to provide means for bodily shifting the arch and beam system transversely of the cultivator frame simultaneously with the steering of the wheels, in connection with means whereby the beams along side of each row can be lever-adjusted to shift the soil-working tools closer to or farther away from the plant rows; also, as a further improvement, to provide for adjusting the pair of beams astride one plant row farther away from or closer to the pair of beams astride the adjoining plant row, to adapt the cultivator to any one of several row spacings, meanwhile retaining the adjustment previously mentioned. Further objects are to provide the cultivator with means by which the weight of the operator may be advantageously employed in pressing the beams down to force the shovels into the ground; to provide for mounting the operator's seat in a relatively low position so that he can have a better view of the plant rows and ovserve more closely the position of the plant rows and the shovels to enable him to guide the cultivator with greater accuracy; and to provide more clearance between the operator's seat support and the cultivator beams so that the beams and shovels may be lifted higher above the ground and therefore will better clear the plants when turning at the ends of the rows, and be less apt to gather trash when the machine is being transported from field to field.

I accomplish these objects as illustrated in the drawings and as hereinafter described. What I regard as new is set forth in the claims.

In the drawings,—

Fig. 1 is a plan view of the cultivator with the tongue broken away.

Fig. 2 is a view similar to Fig. 1, but with the rig system shifted laterally to dodge a misplaced plant, the wheels being correspondingly turned to divert the cultivator in the direction in which the rigs are shifted.

Fig. 3 is a view similar to that of Fig. 2, but showing the cultivator adjusted so that the wheels only are turned to divert the cultivator laterally. In this view, the rig system is disconnected from the wheel-shifting system so that the rigs are always maintained in fixed position transversely of the machine.

Fig. 4 is a front elevation showing the construction of the rig-carrying arches and the connections for adjusting the rigs to various spaced positions.

Fig. 5 is a plan view of the parts shown in Fig. 4.

Fig. 6 is a side elevation of the cultivator.

Fig. 7 is a detail of the pivot support for the seat-carrying bars.

Fig. 8 is a vertical section on the line 8—8 of Fig. 1.

Fig. 9 is a vertical section on the line 9—9 of Fig. 1.

The cultivator frame comprises the usual transverse angle iron bars 1 and 2 spaced apart, and connected near their centers by braces 3, 3, and near their ends by braces 4, 4, the latter formed to converge forwardly and extend beyond their point of connection with the transverse bar 2 and having their ends bent rearwardly so that they may be conveniently secured to angle iron members 5, 5, which, at their rear ends, are fastened to the bar 1. The frame of the cultivator is provided with a forward extension to receive a tongue truck (not shown). The truck extension comprises forwardly converging bars 6, 6 that are secured to the transverse frame bar 2, and to the members 5, 5; also braces 7, 7 that are secured to the frame bar 2 and extend forward and are secured to the truck.

Attached to each end of the frame bar 1 is a bracket 8 having a sleeve portion 9 that receives the vertical stem 10 of a spindle 11 upon the outwardly extending horizontal portion of which is mounted a wheel 12. A dust cap 13 fits over the hub of each wheel and embraces the vertical stem 10 to form a bearing for supporting the sleeve 9. The upper end of each vertical stem 10 is squared and tapered to receive a correspondingly squared and tapered socket of a steering arm 14, the latter having pivotally connected with its forward end, as at 15, a threaded thimble 16 that adjustably receives the threaded portion of a steering rod 17. Each steering rod is connected with a transversely sliding bar 18 that is supported in suitable openings formed in the upwardly extending members 19 of plates 20 that are secured to the braces 3, 3. The wheels are thus connected together so that by moving the bar 18 endwise they may be moved in unison for guiding the machine.

The plates 20 also have portions that lie below the braces 3 and serve as bearings to support a transversely disposed rocking member 21 formed to have rearwardly extending arms 22, the ends of which are inturned and fit into holes provided near their forward ends in seat bars 23, 23. Said seat bars extend rearwardly through suitable openings formed in a depending support, preferably in the form of a plate 24 secured to the frame bar 1, as best seen in Fig. 7. A driver's seat 23a is mounted upon the rear portions of the seat bars. When the member 21 is rocked in its bearings, as will be hereinafter more fully described, the forward ends of the seat bars will be raised or lowered, the seat bars rocking on the support formed by the member 24, and consequently the rear ends of the seat bars and the seat carried thereby will rise or fall.

A foot lever 25 is pivotally mounted intermediate its ends at 25a, upon each seat bar rearwardly of the support 24 as best shown in Fig. 8, by which construction said foot levers move bodily up and down with the seat bars so that they maintain a constant distance from the operator. The lower end of each foot lever is provided with a pedal 26 and the upper ends of said levers are respectively connected by links 27 with the opposite laterally projecting arms of a T-shaped or double bell crank lever 28, which is pivotally mounted at 29 upon the frame bar 1, as best shown in Fig. 2. The third arm 30 of said bell crank lever is slotted at 31 and pivotally connected with the sliding bar 18, so that actuation of either foot lever 25 will turn the bell crank lever and shift the sliding bar transversely of the frame in one direction or the other and, through the connections with the wheel spindles, guide the cultivator.

The earth-working devices 32 are of a conventional type and are connected by the usual fixtures 33 with beams 34, which may comprise one or more longitudinally disposed bars,—in the present instance two bars being used to make up each beam,—the forward ends of which beams are provided with sleeves 35 that are pivotally mounted on the horizontal portions 36 of arch elements supported from the frame. The construction is such that the beams have no lateral swinging movement relative to the arch elements, but the beams may be swung about their horizontal axes to move their rear ends vertically and lift the tools carried by them above the ground, or lower them into engagement with the soil.

To accomplish good cultivation and meet the variations in field conditions, the operator frequently desires to shift the beams with their cultivating devices closer to or farther away from the plant rows, and it is desirable to make this adjustment while the machine is in operation. Two-row planters are usually adjustable so they can be set to plant the rows at various distances apart, and as it is the practice in using a two-row cultivator to straddle the pairs of rows as planted with a two-row planter, I have provided a novel arch construction for supporting the beams so they may be shifted to position the earth-working tools closer to or farther away from the plant row, and for spacing the arches closer together or farther apart to suit different widths of row planting. An arch is provided for each pair of beams, the outer element of each arch comprising an upper horizontal member 37 having a downwardly extending portion 38, the outwardly turned end 36 of which accommodates the sleeve 35 of the beam. Adjustably mounted on the horizontal portion 37 of each arch is a sleeve 39 to which is secured a downwardly projecting member 40 corresponding to the porton 38 of the member 37, and provided with an outwardly turned end 36 which accommodates the sleeve 35 of the other beam of the pair for one plant row.

Mounted on the outwardly turned portion 36 of each depending member of the arch is a collar 41 which, as best shown in Fig. 4, fits in a suitable recess formed in the sleeve 35 and serves to locate and hold the sleeve in place on the arch member as well as forming a pivotal connection for a hanger rod 42 that extends upwardly and is pivotally connected with the transverse frame member 2, said hanger rods serving as swinging suspending means for the arches. Preferably additional holes are provided in the frame bar 2 as indicated on Fig. 4, so that if the operator desires the upper ends of the hanger rods 42 can be shifted to another set of holes when the arch members 38, 40 are set for operation in extreme position. The lower portion of the arches are held from fore and aft movement by brace rods 43 that are pivotally connected with the collars 41 and with brackets 44 secured to the transverse frame member 1. The upper ends of the arches are held from fore and aft movement, but are permitted to shift transversely of the frame by fork-like guide members 45 secured to the angle iron members 5, 5, as shown in Fig. 6. The construction is such that the arches are pivotally suspended and can be freely shifted transversely of the frame, if desired. The manner in which the arches are suspended from the frame is the same in principle as that shown and described in the patent to Holstein 1,346,317 of July 13, 1920.

Counterbalance springs 46 at their lower ends are pivotally connected at 47 with the beams, and at their upper ends are adjustably connected, as at 48, with the brace rods 43. When the beams are raised by means of the lifting devices hereinafter described, these springs aid in the lifting operation. It will be noted that the arches are so constructed that the elements 38 and 40 of each arch can be made either to approach or to recede from each other, this being possible by reason of the fact that the sleeve members 39 of the elements 40 are mounted on the horizontal portions 37 of the elements 38, so that the sleeves can be shifted longitudinally of the portions 37. The means for shifting the elements 38 and simultaneously shifting the sleeve 39 and elements 40 relatively to the elements 38 will now be described.

As best shown in Fig. 2, each sleeve is provided with a lug 49 and each of said lugs is provided with a series of holes, three being shown in the illustrated construction. The sleeve 39 at one side of the machine occupies a reverse position to that of the sleeve 39 at the opposite side of the machine; therefore, the lug 49 of one sleeve projects forwardly while the other projects rearwardly. Each of the sleeves 39 is connected to the opposite arch member 37 by a rod 50, one end of which is bent to engage a hole formed in the horizontal portion of the arch member 37, while the other end of the rod is bent to engage one of the holes in the lug 49. The connections thus established between the arch members 37 are such that when said arch members are shifted transversely of the machine, the rod 50 connected with either of said arch members will simultaneously shift in the same direction the sleeve 39 that is mounted on the opposite arch member 37. Therefore, when the outer element 37, 38 of each of the arches are shifted outwardly, or toward the wheels of the cultivator, the inner elements 40 of said arches are shifted inwardly or toward the center of the cultivator and vice versa.

The outer element 37, 38 of each arch is positively shifted transversely of the cultivator, either outwardly toward the wheels, or inwardly toward the center of the machine, by rods 51, which at their outer ends are connected by clamp collars 52 and set bolts 53 with the horizontal portions 37 of the side elements 38 of the arches. The inner ends of the rods 51 are bent to connect with holes provided in the arms 54 of a T-shaped lever or double bell crank, best shown in Fig. 5, which is pivotally mounted at 55 upon a bracket 56 that is secured to a plate 57 that extends underneath the sliding bar 18, and is supported therefrom by blocks 58 which are fastened to the plate, as best shown in Fig. 9, and are recessed to receive said bar. The plate 57 is further supported in proper position at the front by a bar 59 fastened to frame brackets 60 secured to the frame braces 3, 3. The brackets 60 have depending slotted or fork-like portions 61 in alinement with the guide members 45 and assist the latter in holding the top portion of the arch in upright position.

As above stated, the plate 57 extends under the bar 59, and a clip 62, riveted to the plate member 57, overlies the bar 59. The arms 54 of the bell crank lever can be swung about the pivot 55 by means of a lever 63 pivotally mounted at 64 upon the seat bars 23, and connected by a rod 65 with the third arm 66 of the bell crank lever, as best shown in Fig. 6. The lever 63 is provided with latch mechanism 63ª that engages a rack 63ᵇ secured to the seat bar.

In the construction just described, the operation of the lever 63 rocks the bell crank composed of the arms 66 and 54, 54, and, through the rods 51 and the clamp collars 52, simultaneously shifts the arch elements 38 away from or toward each other, depending upon the direction in which the lever 63 is moved. At the same time, through the connecting rods 50, that extend from the portions 37 of the arches to the sleeves 39, the arch elements 40 are each moved an equal distance and in such direction as to reduce or enlarge the space between the companion elements 38 and 40 of each arch; that is to say, if it is desired to shift the tools two inches farther away from the plant row, a movement of the lever 63 in the proper direction will shift each arch element 38 two inches away from the plant row, and also simultaneously shift each arch element 40 two inches away from the plant row, and by reason of the beams and tools being mounted on the arch elements, the tools will be shifted in the desired direction and the proper distance.

Reference has been made to a series of holes provided in each of the lugs 49. One purpose of these holes is to provide for adjusting the arches at opposite sides of the cultivator toward or from each other. If it be desired to adapt the machine for cultivating plant rows that are spaced closer together or farther apart than the customary standard row spacing, it is only necessary to disengage the rods 50 from the lugs 49, whereupon the sleeves 39, together with the elements 40 and the beams carried thereby, can be shifted either inwardly or outwardly longitudinally of the horizontal member 37 and the rods 50 engaged in other holes of the series. As will be best seen by reference to Fig. 4, such adjustment of the sleeves 39 and elements 40 will vary the distance between the centers of the arches. If, as a result of such adjustment, the earthworking devices 32 carried by the beams, operate too close to or too far away from the plants, the lever 63 can be used to change the spacing between the beams of each pair astride the plant row. The construction described provides for a further adjustment of the arch connections whereby by means of the lever 63 the spacing between the pairs of beams at the opposite sides of the machine can be varied without changing the spacing between the beams of each pair. This is accomplished as follows: Instead of connecting each sleeve 39 with the inner end of the horizontal member 37 of the opposite arch by means of the rods 50, in the manner shown in Fig. 5, each of said sleeves is secured in fixed position on the horizontal portion 37 on which it is mounted by connecting the inner end of its rod 50 with the inner end of the same horizontal arch member 37. This is done by simply disconnecting the inner end of each rod 50 from the opposite arch member 37 and reconnecting it with the inner end of the arch member that carries the sleeve 39 to which the outer end of said rod is connected. In making this alteration the sleeves 39 will be shifted outwardly on the horizontal portions 37 a sufficient distance to enable the inner end of the rod 50 to engage the hole at the inner end of said horizontal portion, or if this outward shifting of the sleeve 39 is undesirable the outer end of the rod 50 may be shifted to the outermost hole in the lug 49. This adjustment is provided because some farmers prefer a cultivator adapted for following variations in the row spacing under the control of a lever, such as the lever 63, whereas others prefer to have the cultivator arranged and adapted for varying the spacing between the beams of each pair under lever control. My improved construction provides for either arrangement. When the cultivator is arranged for the last-mentioned type of adjustment it is also possible to change the spacing between the pairs of beams for different widths of row spacing by changing the connections of the outer ends of the rods 50 with the lugs 49 as previously explained. With the cultivator arranged for either type of adjustment the beams may be shifted transversely simultaneously with the steering of the wheels to follow crooked plant rows, or, the beams may be secured to the frame so that the wheels may be turned in steering independently of transverse movement of the beams, as will presently be described.

The collars 52 may be adjusted relatively to the arch portions 37 to properly locate the arch members transversely with respect to the machine, but when once properly located, no adjustment of these collars should be necessary; that is to say, when the cultivator is once properly assembled, no adjustment at this point is required, but such adjustability is of considerable advantage in the assemblage of the machine for proper operation.

The construction of the cultivator is such that at the option of the operator, the plate 57 that carries the bell crank lever composed of the arms 54, 54 and 66 can be moved transversely of the machine simultaneously with the steering of the wheels without rocking said lever, and thus, through the rod connections 51 and 50, the arch elements and the beams may be moved transversely of the machine simultaneously with the steering movement imparted to the wheels and without any variation in the spacing between the elements 38, 40 of the arches; or the plate 57 can be secured to the frame of the cultivator so that the arches and beams are held against transverse movement, while the wheels are being shifted for guiding purposes. This optional adjustment is accomplished in the following manner: The blocks 58 are provided with holes adapted to receive spring cotters 67 that project through the holes provided in said blocks and corresponding holes provided in the sliding bar 18. If these cotters are inserted as shown in Fig. 1, the plate 57 will be carried with the sliding bar and consequently the arches and beams will be moved simultaneously with the wheels. If it is desired to move only the wheels when the pedals 26 are actuated, the cotters 67 are removed from the blocks 58 and one of the cotters is inserted in a hole provided in the clip 62 and in the plate 57, (see Fig. 3), which holes at this time have been alined with a hole through the bar 59. When the spring cotter is in the latter position, the plate 57 and consequently the arches and beams are anchored to the cultivator frame and the sliding bar 18 will slide through the blocks 58 and on the plate 57.

In Fig. 2, the hole in the clip 62 is indicated at 68, and the hole in the bar 59 at 69. When these holes are in alinement, one of the spring cotters removed from the blocks 58 can be dropped into position to lock the sliding plate 57 to the frame. If it be desired to also lock the wheel system so that it, as well as the beam system, will be rigid with the frame, one of the cotters can be left in place in block 58, and the other cotter inserted through the clip 62 and bar 59. It is only in cases where the cultivator is being transported on the road that this last adjustment is advantageous, because ordinarily it is desirable in field use to shift the wheels and beams simultaneously, or at least to shift the wheels for row following purposes.

As has been suggested, the driver's seat 23a is raised and lowered by the rocking of the member 21, and the construction is such that this raising and lowering of the seat occurs simultaneously with the raising and lowering of the beams. The means for thus conjointly moving the beams and seat support in the same direction will now be described: Each beam is provided with a cross-member 70, as best shown in Fig. 5, which member has one or more openings 70ª therein to receive the end of a pressure rod 71. A compression spring 72, shown in Fig. 6, is mounted on each rod 71 between the upper face of the member 70 and a pin 73 carried by the rod and serves to depress the beam when the rod is lowered, while a cotter pin extending through a hole in the lower end of the rod 71 engages the under face of the member 70 and serves to raise the beam when the rod is lifted. An extra opening 70ª is provided in each member 70, as best seen in Fig. 5, so that by inserting pressure rod 71 in the other opening the spring 72 will exert a more even pressure against the beams in cases where the operator may see fit to secure the shovels 32 and their fixtures 33 to the opposite sides of the beam bars.

As shown in Fig. 6, the pressure rod 71 for the beam carrying the outermost set of tools at each side of the machine is pivotally connected at its upper end with an arm 74 of a rock shaft 75, there being one of the latter at each side of the machine. Each rock shaft 75, near its outer end, is supported in a bearing 76 secured to the frame bar 1, as best shown in Fig. 1, and its inner end is supported in a sector casting 77, there being one of the latter secured to each end of a shaft 78, square in cross-section, that is situated centrally of the machine. Near the inner end of each rock shaft 75 and secured thereto is a hand lever 79 that carries latch mechanism 80, adapted to engage the notches of a sector 81, there being one of the latter formed on each of the sector castings 77. The arrangement is such that by releasing the latch mechanism 80 of either lever 79, the operator can shift such lever and rock its shaft 75 to raise or lower the beam that is connected to it. Thus either one of the outermost beams can be raised and lyowered independently of the other and independently of the innermost beams. The shaft 78 is supported in bearings 82 secured to the frame bar 1 so as to be coaxial with the shafts 75.

Mounted on the exterior of each bearing 82, so as to rotate independently of the shaft 78, is a lever 83 which has a crank arm 84, shown in Fig. 1, that corresponds with the crank arms 74. The pressure rods 71 for the innermost pair of beams are pivotally connected at their upper ends to said arms 84, and each lever 83 carries latch mechanism 85, adapted to engage the notches of a sector 86, there being one of the latter formed on each of the sector castings 77. The arrangement is such that by releasing the latch mechanism 85 of either lever 83, the operator can shift such lever and rock its arm 84 to raise or lower the beam that is connected to it. Thus either one of the innermost beams can be raised and lowered independently of the other and independently of the outermost beams. The levers 79 and 83 are commonly termed "shake-out" levers. They are provided so that any one of the four beams, and the shovels mounted thereon, can be raised clear of the ground to free the shovels of trash, or the shake-out levers may be used to regulate the depth of cultivation of any particular set of shovels.

All of the shovels can be raised or lowered in unison by a master lever 87, which is secured to the shaft 78, as shown in Fig. 1. The master lever is provided with latch mechanism 88, adapted to engage the notches of a sector 89 secured to the cultivator frame. When the lever 87 is operated to turn the shaft 78, the sector castings 77, being secured thereto, are also turned, and by reason of the levers 79 and 83 being in locked engagement with the sectors 81 and 86, respectively, of the sector castings, the beams will be raised or lowered. The rocking member 21 is actuated simultaneously with the rocking of the shaft 78, by a link 90, one end of which is pivotally connected with an arm 91 secured to the rocking member 21, the other end of said link being pivotally connected with an arm 92 of the lever 87.

It will be understood from the foregoing that the operation of the master lever 87 will actuate the arms 74, 84 and, through the connections 71, raise or lower the cultivator beams, and that simultaneously and conjointly the link connection 90 will rock the member 21 to cause the operator's seat to rise or fall, the motion imparted to the seat bars being such that the seat moves upwardly as the beams are raised, and the seat moves downwardly as the beams are lowered. The foot levers 25 move bodily vertically with the seat bar, as above described, so that they are maintained at the same distance from the operator regardless of the position of the seat bar and earth working tools, and, therefore, may always be conveniently operated. This is particularly advantageous since said levers are used for steering the dirigible wheels, as well as for shifting the gangs laterally, and it is often desirable, as when the cultivator is being driven along a road, to steer the wheels while the shovels are elevated out of operative position, and the seat bar is also elevated. If in such case the foot levers were not raised with the seat bar it would be difficult or inconvenient for the operator to manipulate them to steer the machine, whereas by the construction described this objection is avoided. The flexible connections between the foot levers 25 and the lever 28 provided by the links 27 enable the foot levers to be used to steer the wheels from any position that the seat support may assume.

A lever 93 is pivotally mounted on the seat bar and carries latch mechanism 94 that cooperates with a sector 95 secured to the seat bar. This lever is for actuating a link 96 that is pivotally connected to the lower end of the lever, which link at its forward end is connected with and actuates means carried by a fore-truck (not shown) for tilting the cultivator frame and ground wheels to level the frame and beams, or, in other words, to adjust the frame so that the shovels will all penetrate the soil uniformly at different depths of adjustment.

By the construction described the beams along side of each row can be adjusted to shift the soil-working tools closer to or farther away from the plant rows, and the arch and beam system can be bodily shifted transversely of the cultivator frame simultaneously with the steering of the wheels, which is a novel and meritorious feature of the construction shown and described. Furthermore the ability to adjust the pair of beams astride one plant row farther away from or closer to the pair of beams astride the adjoining plant row to adapt the cultivator to any one of several row spacings, meanwhile retaining the above described adjustments, is also a desirable and advantageous one. By providing the vertically movable seat support described, the operator can use his weight to better advantage in connection with applying power to the master lever for lifting the beams or for forcing them into the ground. In lifting the beams he pulls backward on the master lever, which relieves the seat to a greater or less extent of the weight of the operator, and to the extent that the seat is relieved of his weight, it is free to rise simultaneously with the lifting of the beams. On the other hand when the shovels are forced into the ground the operator applies forward pressure to the master lever, which pressure is also exerted against the seat and as the downward movement of the seat aids in depressing the beams, all of the power exerted by the operator against both the seat and the master lever is applied to force the shovels into the ground. Obviously since when the beams are raised the seat bar and the master lever move toward each other, and when the beams are lowered the beams and the master lever move away from each other, this construction utilizes to the best advantage the operator's weight and the force he exerts in operating the cultivator.

The relatively low position of the operator's seat when the shovels are in the soil due to the downward movement of the seat support when the shovels are forced into the ground, is of advantage because it positions the operator where he can have a better view of the plant rows and observe more closely the position of the plants and the shovels, so that he can guide the shovels with greater accuracy and more easily uncover any plants that may be covered with soil thrown up by the shovels. Another advantage resulting from the vertical movement of the seat as described is that elevation of the seat support as the beams are raised, provides more clearance and makes it possible to lift the beams and shovels higher above the ground, since in cultivators the seat is usually located centrally of the machine and the inner beams are directly beneath the seat. When turning at the ends of the rows, it is desirable to lift the shovels above the plants, and when lifted to a high elevation they are less apt to gather trash when the machine is being transported from field to field.

So far as I am aware, I am the first in the art to provide a cultivator of any type with a seat support arranged to be moved vertically in the manner above described, and therefore that feature is claimed generically. Also, the claims to other features of the improved construction shown and described are not intended to be limited to the specific details of such construction, but are to be construed to cover such modifications or variations thereof as would be obvious to those skilled in the art.

What I claim as my invention and desire to secure by Letters Patent, is—

1. In a cultivator, the combination with a wheel supported frame, and vertically and laterally movable tool carrying beams connected therewith, of a vertically movable seat support mounted on the frame, means operable to move said seat support vertically, and means movable vertically with said seat support and operable to move the beams laterally.

2. In a cultivator, the combination with a wheel supported frame, and vertically and laterally movable tool carrying beams connected therewith, of a vertically movable seat support mounted on the frame, means operable to move said seat support vertically and conjointly move said beams vertically, a lever fulcrumed on said seat support and movable vertically therewith, and means operable by said lever to move the beams laterally.

3. In a cultivator, the combination with a wheel supported frame, and vertically movable tool carrying beams connected therewith, of a vertically movable seat support mounted on the frame, a leveling lever mounted on said seat support, and means operable to move said seat support vertically and conjointly move the beams vertically.

4. In a cultivator, the combination with a wheel supported frame, and vertically movable tool carrying beams connected therewith, of a vertically movable seat support, means movable vertically with the seat support and operable to shift the beams laterally with respect to each other, a lever, and means actuated by said lever for simultaneously moving the seat support and said beams vertically.

5. In a cultivator, the combination with a wheel supported frame, and vertically and laterally movable tool carrying beams connected therewith, of a vertically movable seat support, a lever mounted on the frame and operable to raise or lower the beams, means actuated by the operation of said lever to move the seat support vertically, and means movable vertically with the seat support and operable to move the beams laterally.

6. In a cultivator, the combination with a wheel supported frame, and vertically movable tool carrying beams connected therewith, of a vertically movable seat support, means movable vertically with the seat support and operable to move the beams laterally, a lever mounted on the frame and operable to raise or lower the beams, and means actuated by the operation of said lever to move the seat support vertically conjointly with the beams and in the same direction.

7. In a cultivator, the combination with a wheel supported frame, and vertically movable tool carrying beams connected therewith, of a vertically movable seat support, a lever mounted on the frame forward of the driver's seat to swing fore and aft, and means actuated by forward movement of said lever to depress the beams and the seat support.

8. In a cultivator, the combination with a wheel supported frame, and vertically movable tool carrying beams connected therewith, of a vertically movable seat support, a lever mounted on the frame forward of the driver's seat to swing fore and aft, and means actuated by forward movement of said lever to depress the beams and the seat support and by rearward movement of the lever to raise the beams and the seat support.

9. In a two-row cultivator, the combination with a wheel supported frame, and vertically movable tool carrying beams connected therewith, of a vertically movable seat support mounted on the frame, levers operable to separately move the tool carrying beams vertically independently of the seat support, a master lever, and means actuated by the operation of said master lever for moving the beams vertically in unison and for simultaneously moving the seat support vertically in the same direction.

10. In a two-row cultivator, the combination with a frame, dirigible wheels supporting said frame, a vertically movable seat support, means movable vertically with the seat support, and operable to steer said wheels, arches connected with the forward portion of said frame and movable transversely thereof, means operable to shift said arches in unison transversely of the frame simultaneously with the steering of the wheels, vertically movable beams connected with the lower portions of said arches, means operable to move said seat support and the beams vertically, and soil working tools carried by said beams, of means mounted on the frame and operable to shift the beams connected with each arch laterally toward or from each other to vary the distance between the soil working tools and the plant rows.

11. In a two-row cultivator, the combination with a frame, dirigible wheels supporting said frame, a vertically movable seat support, means movable vertically with the seat support, and operable to steer said wheels, arches connected with the forward portion of said frame and movable transversely thereof, means operable to shift said arches in unison transversely of the frame simultaneously with the steering of the wheels, vertically movable beams connected with the lower portions of said arches, means operable to move said seat support and the beams vertically, and soil working tools carried by said beams, of means mounted on the frame and operable to shift the beams connected with each arch laterally toward or from each other to vary the distance between the soil working tools and the plant rows, and means whereby the pair of beams astride one plant row may be adjusted toward or from the pair of beams astride the adjoining plant row.

12. In a two-row cultivator, the combination with a frame, dirigible wheels supporting said frame, arches connected with the forward portion of said frame and movable transversely thereof, each of said arches comprising a pair of members, one member being slidable on the other to vary the width of the arch, means operable to shift said arches in unison transversely of the frame, means operable separately to steer said wheels and adapted to be optionally connected with said arch shifting means to shift said arches transversely, beams connected with the lower end portions of said arches, and soil working tools carried by said beams, of a lever mounted on the frame, and means actuated by the operation of said lever for raising or lowering said tools.

13. In a two-row cultivator, the combination with a frame, dirigible wheels supporting said frame, arches connected with the forward portion of said frame and movable transversely thereof, each of said arches comprising a pair of members, one member being slidable on the other to vary the width of the arch, means operable to shift said arches transversely of the frame, means operable separately to steer said wheels, and adapted to be optionally connected with said arch shifting means to shift said arches transversely simultaneously with the steering of the wheels, beams connected with the lower end portions of said arches, and soil working tools carried by said beams, of a lever and means actuated by the operation of said lever for shifting said beams to move the soil working tools at opposite sides of each plant row closer to or farther away from the row.

14. In a two-row cultivator, the combination with a frame, dirigible wheels supporting said frame, arches at opposite sides of said frame and movable transversely thereof, each of said arches comprising a pair of members, one being slidable on the other to vary the width of the arch, beams connected with the end members of said arches, and soil working tools carried by said beams, of a lever, means operable by said lever to vary the width of said arches to shift the soil working tools at opposite sides of each plant row closer to or farther away from the row, means operable to steer the wheels, and means actuated by said steering means for moving the arches bodily transversely of the frame simultaneously with the steering of the wheels.

15. In a two-row cultivator, the combination with a frame, dirigible wheels supporting said frame, arches comprising a pair of members at opposite sides of said frame and movable transversely thereof, each of said arches comprising members shiftable relatively to each other to vary the width of the arch, beams connected with the end members of said arches, and soil working tools carried by said beams, of a lever, means operable by said lever to vary the width of said arches to shift the soil working tools at opposite sides of each plant row closer to or farther away from the row, means operable to steer the wheels, means actuated optionally by said steering means for moving the arches bodily transversely of the frame simultaneously with the steering of the wheels, and means whereby said arches may be adjusted toward or from each other.

16. In a two-row cultivator, the combination with a frame, dirigible wheels supporting said frame, means operable to steer said wheels, arches connected with the forward portion of said frame, each of said arches comprising an inner and an outer member adjustable relatively to each other to vary the width of the arch, beams connected with the lower portions of said arches, and soil working tools carried by said beams, of devices adapted to connect the inner member of each arch with the outer member of the other arch, a lever, and means connecting said lever with a like member of each arch and operable by said lever to shift the latter arch members toward or from each other, said devices adapted also to connect the inner member of each arch with the outer member of the same arch.

17. In a two-row cultivator, the combination with a frame, dirigible wheels supporting said frame, means operable to steer said wheels, arches connected with the forward portion of said frame and movable transversely thereof, each of said arches comprising an inner member and an outer member in contact with said inner member, said members being adjustable relatively to each other to vary the width of the arch, beams connected with the lower portions of said arches, and soil working tools carried by said beams, of devices connecting the inner member of each arch with the outer member of the other arch, a lever, means connecting said lever with a like member of each arch and operable by said lever to shift the latter arch members toward or from each other, and means for moving said arches bodily transversely of the machine simultaneously with the steering of the wheels.

18. In a two-row cultivator, the combination with a frame, dirigible wheels supporting said frame, means operable to steer said wheels, arches connected with the forward portion of said frame, each of said arches comprising an inner and an outer member adjustable relatively to each other to vary the width of the arch, beams connected with the lower portions of said arches, and soil working tools carried by said beams, of devices connecting the inner member of each arch with the outer member of the other arch, a lever, a three-arm lever mounted on the frame, rods connecting opposite arms of said three-arm lever with a corresponding member of each arch, and means connecting said first-mentioned lever with the third arm of said three-arm lever whereby said three-arm lever may be rocked to move the members of each arch toward or from each other.

19. In a two-row cultivator, the combination with a frame, dirigible wheels supporting said frame, means operable to steer said wheels, arches connected with the forward portion of said frame and movable transversely thereof, each of said arches comprising an inner and an outer member adjustable relatively to each other to vary the width of the arch, beams connected with the lower portions of said arches, and soil working tools carried by said beams, of means directly connecting the inner member of each arch with the outer member of the other arch, a lever, a three-arm lever mounted on the frame, rods connecting opposite arms of said three-arm lever with the outer arch members, means connecting said first-mentioned lever with the third arm of said three-arm lever, whereby said three-arm lever may be rocked to move the members of each arch toward or from each other, and means for bodily moving said three-arm lever transversely of the machine to shift the arches transversely in unison.

20. In a two-row cultivator, the combination with a frame, dirigible wheels supporting said frame, means operable to steer said wheels, arches connected with the forward portion of said frame and movable transversely thereof, each of said arches comprising an inner and an outer member adjustable relatively to each other to vary the width of the arch, beams connected with the lower portions of said arches, and soil working tools carried by said beams, of means directly connecting the inner member of each arch with the outer member of the other arch, a lever, a three-arm lever mounted on the frame, rods connecting opposite arms of said three-arm lever with the outer arch members, means connecting said first-mentioned lever with the third arm of said three-arm lever, whereby said three-arm lever may be rocked to move the members of each arch toward or from each other, and means for connecting said three-arm lever with the steering means to shift the arches in unison transversely of the machine simultaneously with the steering of the wheels.

21. In a two-row cultivator, the combination with a frame, dirigible wheels supporting said frame, arms operable to steer said wheels, a transversely slidable bar mounted on the frame, rods connecting said bar with said arms, a three-arm lever mounted on the frame and connected with said sliding bar for moving the same transversely of the frame, pedals for rocking said three-arm lever, arches connected with the forward portion of said frame, each of said arches comprising inner and outer members movable toward or from each other, beams connected with the lower portions of said arch members, and earth working tools carried by said beams, of a plate supported by the frame and adapted to be connected with said transverse bar or to be disconnected therefrom, a three-arm lever mounted on said plate, rods connecting opposite arms of the latter three-arm lever with the outer members of said arches, a lever connected with the third arm of the latter three-arm lever for rocking the same, and rods connecting the inner member of each arch with the outer member of the other arch.

22. In a cultivator, the combination with a frame, dirigible wheels supporting said frame, and vertically movable tool carrying beams connected with said frame, of a vertically movable seat support mounted on the frame, means operable to move said seat support vertically, and means movable vertically with said seat support and operable to steer said dirigible wheels.

23. In a cultivator, the combination with a frame, dirigible wheels supporting said frame, and vertically movable tool carrying beams connected with said frame, of a vertically movable seat support mounted on the frame, means operable to move said seat support vertically and conjointly move said beams vertically in the same direction, and means movable vertically with said seat support and operable to steer said dirigible wheels.

24. In a cultivator, the combination with a frame, dirigible wheels supporting said frame, and vertically movable tool carrying beams connected with said frame, of a vertically movable seat support mounted on the frame, means operable to move said seat support vertically, a lever fulcrumed on said seat support and movable vertically therewith, and means operable by said lever to steer said dirigible wheels.

25. In a cultivator, the combination with a frame, dirigible wheels supporting said frame, and vertically movable tool carrying beams connected with said frame, of a vertically movable seat support mounted on the frame, means operable to move said seat support vertically and conjointly move said beams vertically in the same direction, a lever fulcrumed on said seat support and movable vertically therewith, and means operable by said lever to steer said dirigible wheels.

26. In a cultivator, the combination with a frame, dirigible wheels supporting said frame, and vertically and laterally movable tool carrying beams connected with said frame, of a vertically movable seat support mounted on the frame, means operable to move said seat support vertically and conjointly move said beams vertically, and means movable vertically with said seat support and operable to steer said dirigible wheels and to move said beams laterally.

27. In a cultivator, the combination with a frame, dirigible wheels supporting said frame, steering devices for said wheels, and vertically movable tool carrying beams connected with said frame, of a vertically movable seat support mounted on the frame, means operable to move said seat support vertically and conjointly move said beams vertically, and a lever movable vertically with said seat support and flexibly connected with said steering devices for actuating the same.

28. In a cultivator, the combination with a wheel supported frame, and vertically and laterally movable tool carrying beams connected therewith, of a vertically movable seat support, a lever mounted on the frame, means actuated by forward movement of said lever to depress the beams and the seat support, and means movable vertically with said seat support and operable to move the beams laterally.

29. In a cultivator, the combination with a frame, dirigible wheels supporting said frame, and vertically movable tool carrying beams connected with said frame, of a vertically movable seat support, a lever mounted on the frame, means actuated by rearward movement of said lever to raise the beams and the seat support, and means movable vertically with said seat support and operable to steer said dirigible wheels.

30. In a cultivator, the combination with a wheel supported frame, arches connected with the forward portion of said frame, each of said arches comprising an inner and an outer member adjustable relatively to each other to vary the width of the arch, beams connected with said arches, and soil working tools carried by said beams, of means directly connecting the inner member of each arch with the outer member of the other arch, a lever and means connecting said lever with a like member of each arch, and operable by said lever to move the members of each arch toward or from each other.

31. In a cultivator, the combination with a wheel supported frame, arches connected with the forward portion of said frame, each of said arches comprising an inner and an outer member adjustable relatively to each other to vary the width of the arch, beams connected with said arches, and soil working tools carried by said beams, of means directly connecting the inner member of each arch with the outer member of the other arch, a lever, means connecting said lever with a like member of each arch, and operable by said lever to move the members of each arch toward or from each other, and means whereby said arches may be shifted toward or from each other, said means being optionally operated with said first named means.

32. In a cultivator, the combination with a wheel supported frame, arches connected with the forward portion of the frame and movable transversely thereof, each of said arches comprising an inner and an outer member adjustable relatively to each other to vary the width of the arch, beams connected with said arches, and soil working tools carried by said beams, of devices connecting the inner member of each arch with the outer member of the other arch, a lever, a three-arm lever mounted on the frame, rods connecting opposite arms of said three-arm lever with the outer arch members, means connecting said first-mentioned lever with the third arm of said three-arm lever, whereby said three-arm lever may be rocked to move the members of each arch toward or from each other, vertically swinging levers, and means actuated by the latter levers for bodily moving said three-arm lever transversely of the machine to shift the arches in unison in one direction or the other.

33. In a cultivator, the combination with a wheel supported frame, a transversely slidable bar mounted on the frame, a three-arm lever mounted on the frame and connected with said sliding bar for moving the same transversely of the frame, pedals for rocking said three-arm lever, arches connected with the forward portion of said frame, each of said arches comprising inner and outer members movable toward or from each other, beams connected with said arch members, and earth working tools carried by said beams, of a plate supported by the frame and adapted to be connected with said transverse bar or to be disconnected therefrom, a three-arm lever mounted on said plate, rods connecting opposite arms of the latter three-arm lever with the outer members of said arches, a lever connected with the third arm of the latter three-arm lever for rocking the same, and rods connecting the inner member of each arch to the outer member of the other arch.

34. In a cultivator, the combination with a wheel supported frame, a transversely slidable bar mounted on the frame, a three-arm lever mounted on the frame and connected with said sliding bar for moving the same transversely of the frame, a vertically movable seat support, foot levers fulcrumed on said seat support and operatively connected with opposite arms of said three-arm lever for rocking the same, arches connected with the forward portion of said frame, each of said arches comprising inner and outer members movable toward or from each other, vertically movable beams connected with said arch members, and earth working tools carried by said beams, of a plate supported by the frame and adapted to be connected with said transverse bar or to be disconnected therefrom, a three-arm lever mounted on said plate, rods connecting opposite arms of the latter three-arm lever with the outer members of said arches, a lever connected with the third arm of the latter three-arm lever for rocking the same, rods connecting the inner member of each arch with the outer member of the other arch, and means operable to move the seat support vertically and conjointly move the beams vertically in the same direction.

35. In a two-row cultivator, the combination with a frame, dirigible wheels supporting said frame, arms operable to steer said wheels, a transversely slidable bar mounted on the frame, rods connecting said bar with said arms, a three-arm lever mounted on the frame and connected with said sliding bar for moving the same transversely of the frame, a vertically movable seat support, foot levers fulcrumed on said seat support and connected with opposite arms of said three-arm lever for rocking the same, arches connected with the forward portion of said frame, each of said arches comprising inner and outer members movable toward or from each other, vertically movable beams connected with said arch members, and earth working tools carried by said beams, of a plate supported by the frame and adapted to be connected with said transverse bar or to be disconnected therefrom, a three-arm lever mounted on said plate, rods connecting opposite arms of the latter three-arm lever with the outer members of said arches, a lever connected with the third arm of the latter three-arm lever for rocking the same, rods connecting the inner member of each arch with the outer member of the other arch, and means operable to move said seat support vertically and coincidently move said beams vertically in the same direction.

36. A two-row cultivator comprising in combination the following instrumentalities: a frame, dirigible wheels supporting said frame, transversely movable arches each comprising inner and outer members movable toward or from each other, foot levers operatively connected with said wheels and operable to steer the same, means for optionally connecting said foot levers with said arches for moving said arches transversely in unison coincidently with the steering of said wheels, or for disconnecting said arches from said foot levers for steering said wheels independently of transverse movement of said arches, means operable to shift the members of each arch toward or from each other, means whereby said arches may be shifted toward or from each other, vertically movable beams connected with said arch members, means operable to move the beams vertically in unison, and means operable to move the beams vertically independently of each other.

37. A two-row cultivator comprising in combination the following instrumentalities: a frame, dirigible wheels supporting said frame, transversely movable arches each comprising inner and outer members movable toward or from each other, a vertically movable seat support, foot levers, fulcrumed on said seat support, operatively connected with said wheels and operable to steer the same, means for optionally connecting said foot levers with said arches for moving said arches transversely in unison coincidently with the steering of said wheels, or for disconnecting said arches from said foot levers for steering said wheels independently of transverse movement of said arches, means operable to shift the members of each arch toward or from each other, means whereby said arches may be shifted toward or from each other, vertically movable beams connected with said arch members, means operable to move the beams vertically in unison and simultaneously move said seat support vertically in the same direction, and means operable to move the beams vertically independently of each other.

38. A two-row cultivator comprising in combination the following instrumentalities: a frame, dirigible wheels supporting said frame, transversely movable arches each comprising inner and outer members movable toward or from each other, means operable to shift the members of each arch toward or from each other, or optionally to shift said arches bodily toward or from each other, means whereby said wheels may be steered and said arches moved transversely in unison, and vertically movable beams connected with said arch members.

39. A two-row cultivator comprising in combination the following instrumentalities: a frame, dirigible wheels supporting said frame, transversely movable arches each comprising inner and outer members movable toward or from each other, means operable to shift the members of each arch toward or from each other, or optionally to shift said arches bodily toward or from each other, means whereby said wheels may be steered and said arches moved transversely in unison or, optionally, said wheels may be steered independently of transverse movement of said arches, and vertically movable beams connected with said arch members.

40. In a two-row cultivator, the combination with a wheel supported frame, of transversely movable arches connected with said frame, each of said arches comprising two side elements, one of said side elements having a horizontal top portion formed therewith, the other side element of the same arch being in the form of a separate member shiftably mounted on the horizontal portion of the first side element of such arch and connected with the horizontal portion of the like side element of the other arch, means for holding the side elements of each arch in fixed relation to each other, and beams connected with said side elements respectively.

41. In a two-row cultivator, the combination with a wheel supported frame, of transversely movable arches connected with said frame, each of said arches comprising two side elements, one of said side elements having an inturned horizontal top portion formed therewith, and a lower out-turned horizontal portion, the other side element having a lower out-turned horizontal portion and a sleeve at its upper end adapted to slide on the horizontal top portion of the other side element, beams connected with the out-turned horizontal portions of said side elements, and means for adjusting said sleeve and said horizontal top portion with respect to each other longitudinally of said horizontal top portion.

42. A two-row cultivator comprising the combination of a frame, dirigible wheels supporting said frame, arches connected with the frame and movable transversely thereof, means operable to steer said dirigible wheels, means operable at will to connect said arch shifting means to said wheel steering means, and means to lock said two last mentioned means to hold said wheels and said arches in fixed position on the frame.

43. A two-row cultivator comprising the combination of a frame, dirigible wheels supporting said frame, arches connected with the frame and movable transversely thereof, means operable to steer said dirigible wheels, means operable at will to connect said arch shifting means to said wheel steering means, and means to releasably secure the arch shifting means to the frame to prevent shifting of the arches, said last mentioned means being operable independently of the position of the means connecting the steering means to the arch shifting means.

44. In a two-row cultivator, the combination with a wheel supported frame, of transversely movable arches connected with said frame, each of said arches comprising two side elements, movable relatively to each other, one of said side elements having a horizontal top portion, the other side element having a sleeve at its upper end adapted to be carried by and slide on the horizontal top portion of said one side element, beams connected with said side elements, and means for adjusting said sleeve and said horizontal top portion with respect to each other longitudinally of said horizontal top portion.

45. In a two-row cultivator, the combination with a wheel supported frame and arches supported from said frame, each arch comprising an inner and an outer member adjustable relatively to each other to vary the width of the arch, of a lever, connections from said lever to like members of each arch, and means disposed in the same plane as said connections and arranged for optionally connecting the inner member of each arch with the outer member of the other arch, whereby movements of said lever changes the width of each arch, or connecting the inner member of each arch with the outer member of the same arch, whereby movements of said lever changes the distance between center lines of the arches.

46. In a cultivator, the combination with a wheel supported frame and arches connected with the forward portion of said frame, each of said arches comprising an inner and an outer member adjustable relatively to each other, of link means arranged to optionally connect the inner member of each arch with the outer member of the other arch, or to connect the inner member of each arch directly to the outer member of the same arch, and means for moving said link means to adjust the arches.

47. In a cultivator, the combination with a wheel supported frame, arches connected with the forward portion of said frame, each of said arches comprising an inner and an outer member adjustable relatively to each other, of mechanism adapted to optionally connect the inner member of each arch to the outer member of the other arch, or to connect the inner member of each arch with the outer member of the same arch, said mechanism including means carried by the inner members of each arch for fixing said members with respect to the outer members of the same arch, and means for actuating the connecting means to adjust the arches.

48. In a cultivator, the combination with a wheel supported frame and arches comprising an outer member having a horizontal portion rigid therewith and an inner member slidably mounted on the horizontal portion, of link means arranged to optionally connect the inner member of each arch with the outer member of the other arch, or to connect the inner member of each arch with the outer member of the same arch, and means for moving said link means to adjust the arches.

49. In a cultivator, the combination with a wheel supported frame and arches connected with the forward portion of said frame, each of said arches comprising an inner and an outer member adjustable relatively to each other, one of said members having a horizontal portion rigid therewith and the other member being slidably mounted on said horizontal portion, of link means arranged to optionally connect the inner member of each arch to the outer member of the other arch, or to connect the inner member of each arch with the outer member of the same arch, and means for moving said link means to adjust the arches.

50. In a two-row cultivator, the combination with a wheel supported frame and arches supported from said frame, each arch comprising an outer member having a horizontal portion rigid therewith and an inner member slidably mounted on the horizontal portion, said members being adjustable relatively to each other to vary the width of the arch, of a lever, connections from said lever to like members of each arch, and means for optionally connecting the inner member of each arch with the horizontal portion of the other arch, whereby movement of the lever changes the width of each arch, or connecting the inner member of each arch to the horizontal member upon which it is mounted whereby movement of the lever changes the distance between the center lines of the arches.

CARL G. STRANDLUND.